United States Patent
Liu et al.

(10) Patent No.: US 11,789,037 B2
(45) Date of Patent: Oct. 17, 2023

(54) INTEGRATED DUAL-PROBE RAPID IN-SITU SWITCHING MEASUREMENT METHOD AND DEVICE OF ATOMIC FORCE MICROSCOPE

(71) Applicant: SHENYANG INSTITUTE OF AUTOMATION, CHINESE ACADEMY OF SCIENCES, Liaoning (CN)

(72) Inventors: Lianqing Liu, Liaoning (CN); Jialin Shi, Liaoning (CN); Peng Yu, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 17/757,343

(22) PCT Filed: May 8, 2021

(86) PCT No.: PCT/CN2021/092279
§ 371 (c)(1),
(2) Date: Jun. 14, 2022

(87) PCT Pub. No.: WO2022/057277
PCT Pub. Date: Mar. 24, 2022

(65) Prior Publication Data
US 2023/0019239 A1      Jan. 19, 2023

(30) Foreign Application Priority Data
Sep. 16, 2020   (CN) .......................... 202010973514.0

(51) Int. Cl.
*G01Q 60/24*     (2010.01)
*G01Q 10/04*     (2010.01)
(Continued)

(52) U.S. Cl.
CPC .......... *G01Q 60/38* (2013.01); *G01Q 10/045* (2013.01); *G01Q 20/02* (2013.01); *G01Q 70/06* (2013.01)

(58) Field of Classification Search
CPC ........ G01Q 60/24; G01Q 60/32; G01Q 60/34; G01Q 60/38; G01Q 70/02; G01Q 10/045
See application file for complete search history.

(56) References Cited

U.S. PATENT DOCUMENTS 5,276,672 A    1/1994   Miyazaki et al.
5,540,958 A    7/1996   Bothra et al.
(Continued)

FOREIGN PATENT DOCUMENTS

CN    101629885 A    1/2010
CN    103412150 A    11/2013
(Continued)

OTHER PUBLICATIONS

M. Despont et al., "Dual-cantilever AFM probe for combining fast and coarse imaging with high-resolution imaging," Proceedings IEEE Thirteenth Annual International Conference on Micro Electro Mechanical Systems (Year: 2000).*

*Primary Examiner* — Eliza W Osenbaugh-Stewart
(74) *Attorney, Agent, or Firm* — NKL Law; Allen Xue

(57) ABSTRACT

An atomic force microscope has dual probes composed of a hinge structure, two cantilever beams and needle tips arranged on free ends of the cantilever beams. The hinge structure is a U-shaped body having two ends respectively extended with a first cantilever beam and a second cantilever beam. The free end of the first cantilever beam and the free end of the second cantilever beam are respectively provided with a first needle tip and a second needle tip. The integrated dual probes is operated by the driving function of the probe clamp. Therefore, only a set of motion control and measure- (Continued)

ment system of the atomic force microscope is required to realize the rapid in-situ switching function of the dual probes.

8 Claims, 12 Drawing Sheets

(51) Int. Cl.
*G01Q 20/02* (2010.01)
*G01Q 60/38* (2010.01)
*G01Q 70/06* (2010.01)

(56) References Cited

U.S. PATENT DOCUMENTS

| 6,196,061 | B1 | | 3/2001 | Adderton et al. | |
|---|---|---|---|---|---|
| 6,365,895 | B1 | * | 4/2002 | Yamamoto | G01Q 70/14 |
| | | | | | 850/52 |
| 2014/0283228 | A1 | * | 9/2014 | Su | G01Q 60/32 |
| | | | | | 850/1 |
| 2016/0231351 | A1 | | 8/2016 | Lee et al. | |

FOREIGN PATENT DOCUMENTS

| CN | 110763873 | A | 2/2020 |
|---|---|---|---|
| JP | 2005201748 | A | 7/2005 |

* cited by examiner

INTEGRATED DUAL-PROBE RAPID IN-SITU SWITCHING MEASUREMENT METHOD AND DEVICE OF ATOMIC FORCE MICROSCOPE

TECHNICAL FIELD

The present invention relates to an integrated dual-probe imaging and measurement method and system based on an atomic force microscope capable of realizing rapid in-situ switching, particularly to a method and system for independent motion control and detection of integrated dual probes and single probe, to keep the switching time of the operating state of dual probes within 10 seconds and keep the operating position of a needle tip after switching within 1 micron or less, so as to realize the rapid in-situ switching of dual probes and complete nano imaging and measurement. The present invention is mainly used for various fields of imaging and detection of morphology, mechanics, electricity, chemistry and life science with nanoscale spatial resolution.

BACKGROUND

A typical atomic force microscope system can measure the interaction between a needle tip and a sample by using a flexible probe including a micron cantilever beam and a nanometer needle tip. The principle is as follows: the laser is irradiated to the flexible cantilever beam through an emitter, the back of the cantilever beam can reflect the laser well, and the reflected laser is irradiated on a photoelectric position sensitive detector. The interaction between the needle tip and the sample makes the flexible cantilever beam bend to a certain extent, which will cause the change of the position of a reflected laser spot on the photoelectric position sensitive detector to change, so as to detect the bending of the cantilever beam. The atomic force microscope system conducts control of scanning imaging and measurement of mechanical information according to the bending value of the cantilever beam as an input signal.

However, single-probe imaging and measurement have disadvantages, which need to be compensated by dual-probe switching imaging and measurement. For example, in the process of high-resolution imaging, a probe with a relatively thick tip (for example, a tip radius of 10 nanometers to 1 micron) is generally used for large-range coarse scanning imaging at first to find the approximate position of a target, and then a fine tip (for example, a tip radius of 1 nanometer to 10 nanometers) is used to narrow the scanning range for high-resolution imaging. High-resolution requires the fine tip, but the fine tip is easy to be worn and polluted. The fine tip after large-range high-speed imaging generally cannot meet the requirements of high-resolution imaging, especially biological samples with high viscoelasticity under complex liquid environments. An ideal solution is: firstly, a relatively thick-tip probe, which is not easy to be worn and polluted, is used for large-range high-speed imaging, and then a relatively fine-tip probe is used for local high-resolution imaging after the target position is determined. For example, when the mechanical properties of the samples are measured, cantilever beams with appropriate elastic coefficients should be selected for measurement of the samples with different hardness. A probe with a small spring constant (0.5 n/m to 10 n/m) is selected to measure a soft sample (Young's modulus is 1 Mpa to 500 Mpa), and a probe with a large spring constant (5 n/m to 40 n/m) is selected to measure a hard sample (Young's modulus is 200 Mpa to 2000 Mpa), i.e., stiffness matching. For samples with large span of mechanical properties, such as heterogeneous samples with multiple mixed materials, the spring constant of one cantilever beam cannot simultaneously meet the measurement requirements of multiple materials with mechanical properties. An ideal solution is: dual probes with different spring constant are used to independently measure regions of materials with different mechanical properties. For example, when the specific molecular binding force of the sample surface is measured, the probe needs to be chemically modified so that the probe surface carries chemical molecules that can produce the specific binding force with the molecules on the sample surface. However, the chemical molecules on the surface of the chemically modified probe are extremely easy to be polluted and destructed, and the modified probe may lose the functionality after large-range high-speed imaging. Therefore, an ideal solution is: dual probes are used; firstly, one probe is used to conduct large-range high-speed scanning imaging; and after a target position is found, the chemically modified probe is used to measure the specific molecular binding force to ensure the validity of the measurement results.

At present, the dual-probe switching imaging and measurement methods of the atomic force microscope have respective disadvantages, and cannot meet the above requirements. The most widely used method is: imaging and measurement are stopped firstly, and the probe is kept away from the sample surface; then the probe is replaced manually or automatically (including disassembly and installation of the probe); and a target point on the sample surface is found again and the probe is inserted for secondary scanning imaging and measurement. The traditional mode has serious problems of long probe replacement time (ten minutes to ten seconds), poor repeated positioning accuracy and high cost of automatic probe replacement system. Compared with the traditional method, an integrated dual-probe rapid in-situ switching method is a more ideal solution. For integrated dual probes, two cantilever beams are manufactured on the same probe base and the motion of the two cantilever beams is independently controlled to realize the rapid in-situ switching of dual probes without the complex steps of probe lifting, probe disassembly, probe assembly, probe insertion and repositioning. The integrated dual probes need only a set of motion control and probe position measurement system, which greatly reduces the cost. However, the size of the integrated dual probes is on the micron scale, and the precise independent motion control and independent position measurement are the major problems. One solution is to integrate piezoelectric ceramics on the cantilever beams to realize independent motion control. Another solution is integrated manufacturing of large area temperature-sensitive electrodes on the cantilever beams. Independent drive is realized by electrostatic force, and the positions of the cantilever beams are detected by thermistors. In addition, another solution is integrated manufacturing of piezoelectric ceramic layers (also known as "active probes") on the cantilever beams. Independent drive is realized by applying voltage to the piezoelectric ceramics, and the positions of the cantilever beams are detected by detecting the output voltage of the piezoelectric ceramics. Although the above methods can realize the function of independent driving and measurement of double probes, the methods still have the following disadvantages: 1. The method has special requirements for samples and working environment, and cannot be applied to liquid, biological and non-conductive samples, and the working environment and measurement objects are limited; 2. the structure and the manufacturing technology of the probe are complex, advanced imaging control modes (such as peak force tapping mode) cannot be applied in mechanical properties, and functions are limited; 3. an optical measurement method is abandoned, compatibility with a commercial atomic force microscope system is difficult, and the application is limited; and 4. the motion range of the active probe is small (about 20 nm), which cannot meet the requirements of large-range independent motion of the dual probes.

Therefore, it is urgent to develop an integrated dual-probe rapid in-situ switching, imaging and measurement method and device which can be used under atmosphere and liquid environments, have no special requirements for samples, can apply the advanced imaging modes and can be integrated with a commercial optical measurement system.

SUMMARY

Technical problems to be solved by the present invention are a drive method for independent motion of dual probes with ultra-short working distance, a control method for independent motion, a measurement method for independent motion, a rapid in-situ switching method and an advanced imaging mode control method.

To solve the above technical problem, the present invention adopts the following technical solution: an integrated dual-probe rapid in-situ switching measurement device of an atomic force microscope comprises dual probes composed of a hinge structure, two cantilever beams and needle tips arranged on free ends of the cantilever beams;

The hinge structure is a U-shaped body; two ends are respectively extended with a first cantilever beam and a second cantilever beam; and the free end of the first cantilever beam and the free end of the second cantilever beam are respectively provided with a first needle tip and a second needle tip. The dual probes are arranged on a dual-probe clamp; the dual-probe clamp comprises: a fixture, a probe base, a probe clamp fixing base and piezoelectric ceramics for driving a single cantilever arm; the probe base is connected with the probe clamp fixing base, and the hinge structure is fixed on the probe base through the fixture; and a piezoelectric ceramic controller connected with the piezoelectric ceramics is used to drive the single-sided cantilever beam by controlling the piezoelectric ceramics to realize independent motion of the single-sided cantilever beam.

At least one of spring constants of the two cantilever arms, the sizes of two needle tips and the materials of the two needle tips is different.

The piezoelectric ceramic controller connected with the piezoelectric ceramics is used to drive two cantilever beams by controlling the piezoelectric ceramics to realize independent motion of the two-sided cantilever beams.

The surfaces of the two cantilever arms are located in the same plane, and the distance between the two adjacent cantilever arms is less than 10 microns.

The integrated dual-probe rapid in-situ switching measurement device of the atomic force microscope further comprises a reflected light detector; and the reflected light detector is used to receive laser reflected by two cantilever arms.

The integrated dual-probe rapid in-situ switching measurement device of the atomic force microscope is used to achieve a contact mode, a tapping mode or a peak force tapping mode through the dual probes.

An integrated dual-probe rapid in-situ switching measurement method of an atomic force microscope comprises the following steps:

in a non-operating state, the positions of the two cantilever beams are in a horizontal state, and a sample is located below the first needle tip of the first cantilever beam; controlling the two cantilever beams to produce relative motion; making the position of the first needle tip lower than the position of the second needle tip; controlling the first cantilever beam and the sample to produce relative motion with a distance of $z3$, and at this time, making the first needle tip come into contact with a test point on the sample for measurement or scanning imaging;

controlling the two cantilever beams to produce relative motion and making the positions thereof in a horizontal state; controlling the relative motion between the dual probes and the sample, and making the sample move along the direction of motion by a distance d which is the distance between two needle tips; and at this moment, making a measurement point located below the second needle tip;

controlling the two cantilever beams to produce relative motion; making the position of the second needle tip lower than the position of the first needle tip; controlling the second cantilever beam and the sample to produce relative motion with a distance of $z4$, and making the second needle tip come into contact with a measurement point for measurement or scanning imaging to complete a rapid in-situ switching process of the probe.

An integrated dual-probe measurement method for bending motion and twisting motion of an atomic force microscope comprises the following steps:

irradiating the laser on the two cantilever beams, forming two spots on the first cantilever beam and the second cantilever beam, reflecting to the reflected light detector, and forming a first laser spot and a second laser spot respectively;

controlling the two cantilever beams to produce relative motion; making the position of the second cantilever beam lower than the position of the first cantilever beam; at this moment, making the second laser spot reflected by the second cantilever beam move downwards; making the first cantilever beam not move, and making the first laser spot reflected by the first cantilever beam not move;

adjusting the position of the reflected light detector, making the center of the second laser spot in the center position of the reflected light detector, and making the first laser spot at the outer side or the edge of the reflected light detector;

when the second cantilever beam moves independently, producing corresponding transverse and longitudinal motion by the second laser spot reflected to the reflected light detector by the second cantilever beam to obtain the twisting motion and the bending motion of the second cantilever beam respectively;

when the first laser spot reflected by the static first cantilever beam is located inside the reflected light detector, making the first laser spot stationary to obtain the twisting motion and the bending motion of the second cantilever beam.

An integrated dual-probe tapping mode imaging method of an atomic force microscope comprises the following steps:

irradiating the laser on one cantilever beam of the dual probes and reflecting to the reflected light detector to form a laser spot; sending a compound signal of a DC shift signal and an AC vibration signal generated by an operating probe displacement driver to the piezoelectric ceramic controller, driving a single piezoelectric ceramic corresponding to the cantilever beam to produce compound motion of static shift and high frequency vibration, and driving the cantilever beam to produce compound motion of the same mode;

detecting the motion of the cantilever beam by the reflected light detector after amplified by the laser light path, and sending a generated operating probe AC signal into a lock-in amplifier as an input signal; making a compound signal of the DC shift signal and the AC vibration signal pass through a DC isolation circuit, and sending the AC vibration signal into the lock-in amplifier as a reference signal; outputting the amplitude of a signal component of the operating probe AC signal in the same frequency as the reference signal by the lock-in amplifier, sending the amplitude into a subtracter to make a difference with a set value of the amplitude, and sending the difference value to a feedback controller; and outputting a control signal by the feedback controller and sending to a three-dimensional motion driver to control the three-dimensional motion of a scanning head or sample to realize scanning imaging.

The present invention has the following beneficial effects:
1. The present invention adopts integrated dual probes and drives the operating probe to work by the driving function of the probe clamp. Therefore, only a set of motion control and measurement system of the atomic force microscope is required to realize the rapid in-situ switching function of the dual probes.
2. The present invention adopts the hinge-based motion control method to realize switching between the operating probe and the non-operating probe, and the laser light rod measurement method to realize the position measurement of the probes. Therefore, the present invention can be operated in the atmosphere and liquid environments, and has no special requirement for the working environment and samples.
3. The present invention is easy to integrate with commercial atomic force microscope systems on the market. Taking Dimension-Icon atomic force microscope of Bruker company as an example, the present invention can be simplified as integrated dual probes and corresponding driving probe clamp. After the probes are installed on the probe clamp, the probe clamp with the probes is installed on the Dimension-Icon scanning head to achieve integration.

Figure 9:
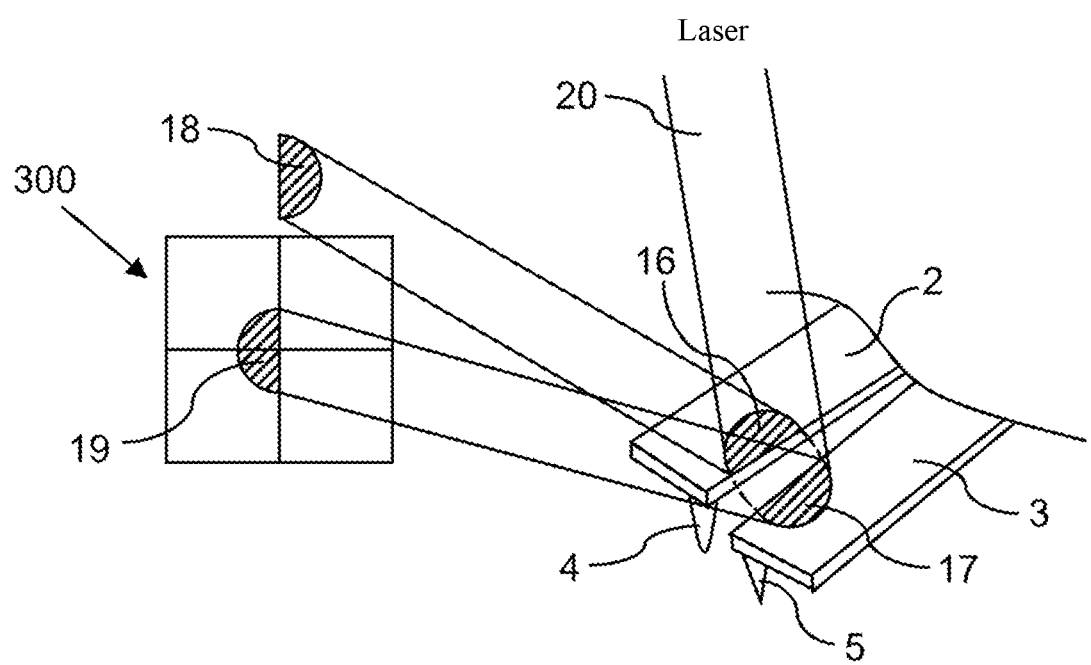
Figure 10:
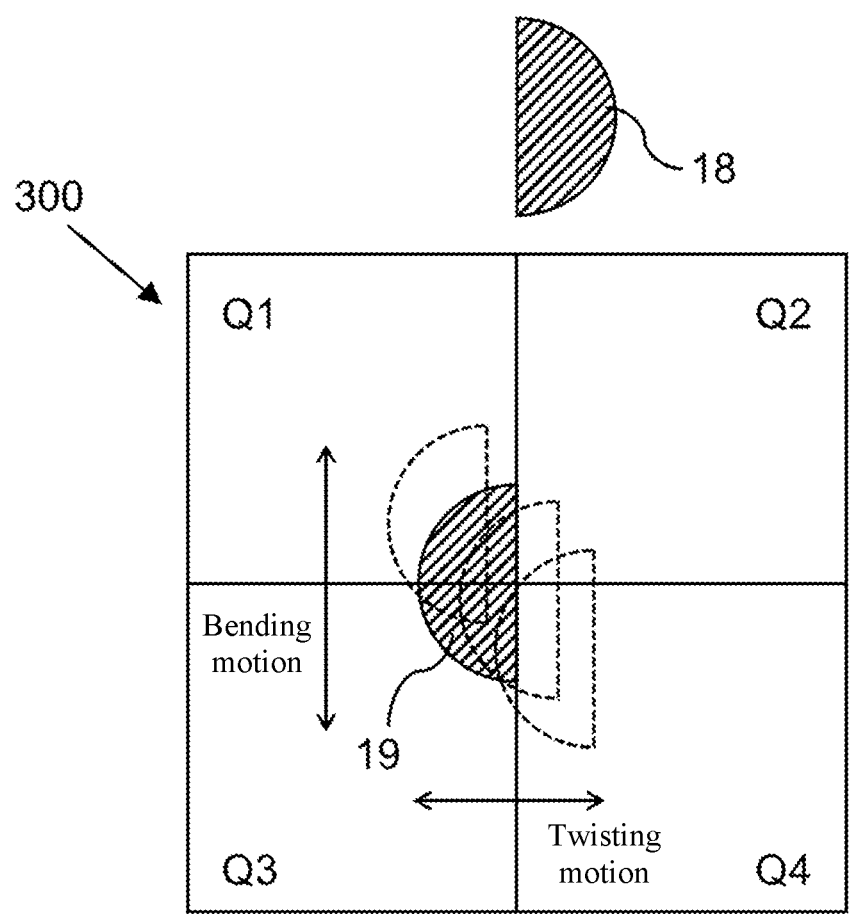
Figure 11A:
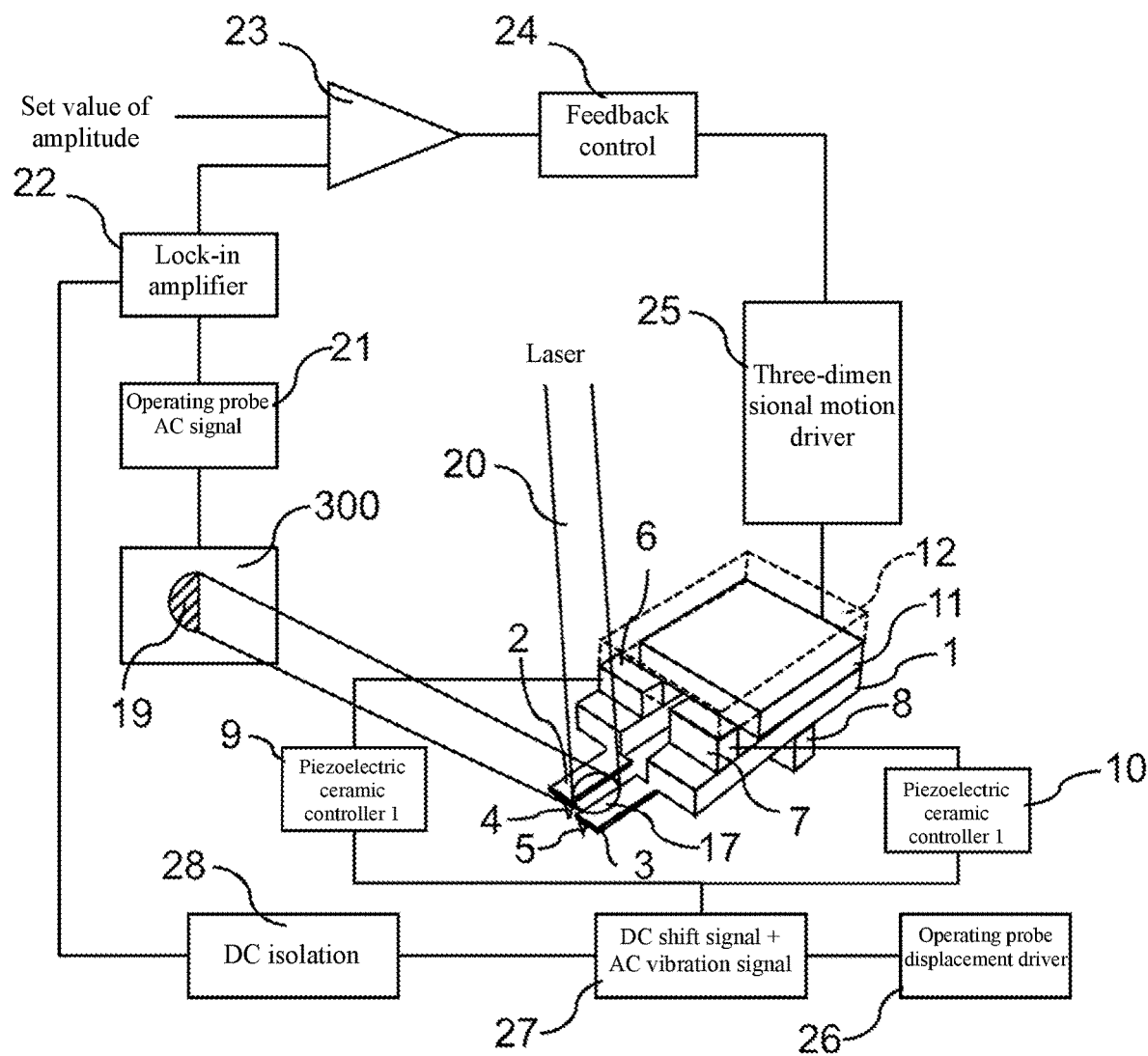
Figure 11B:
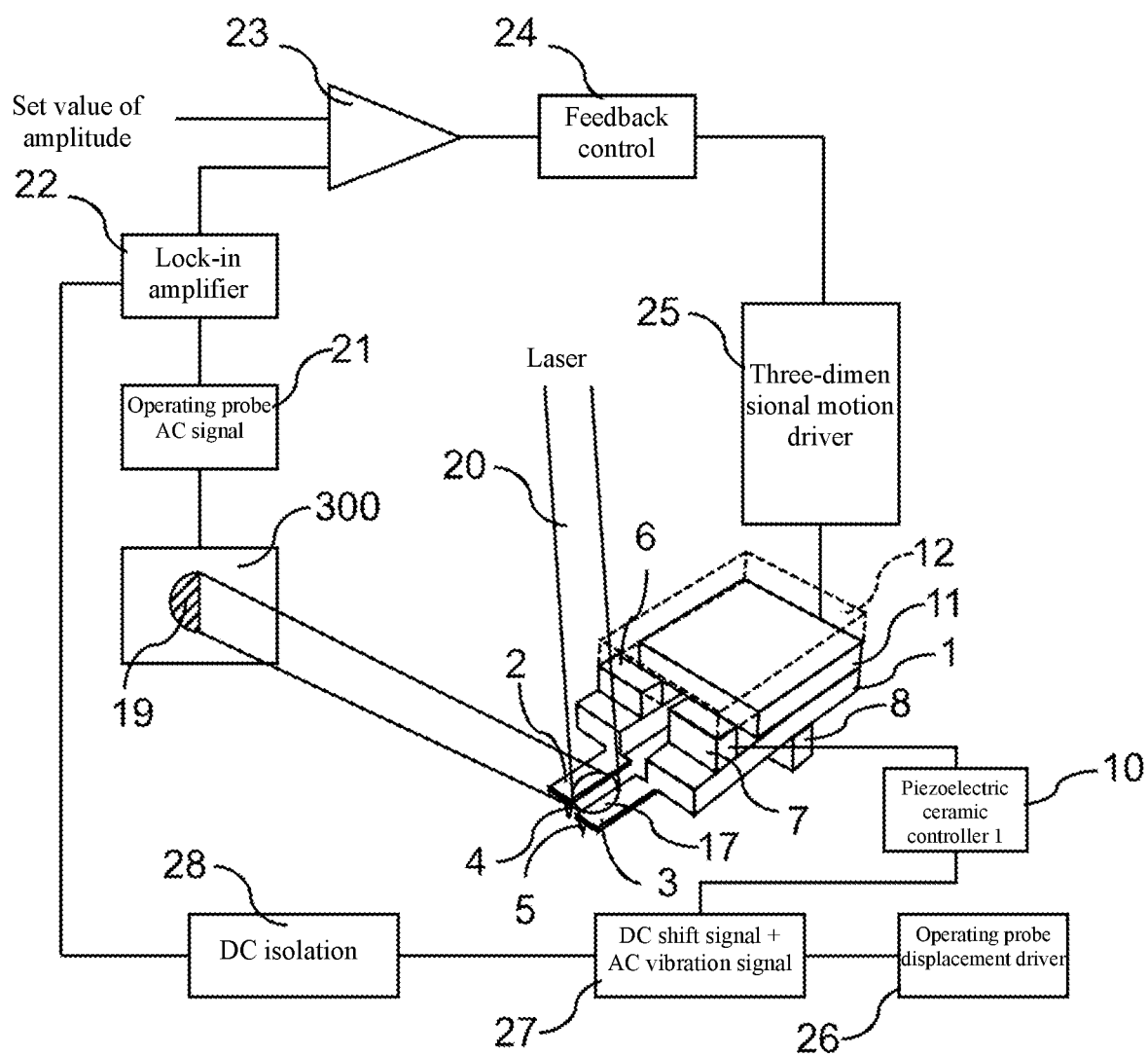
Figure 12:
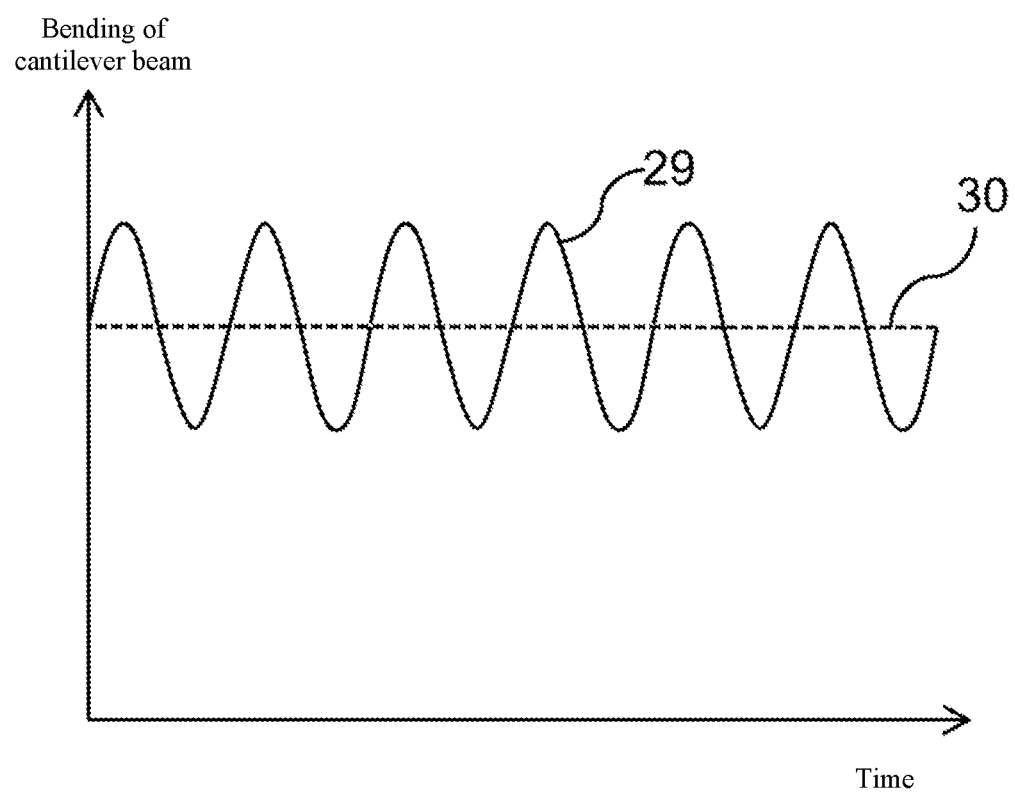

wherein 13 is a test point, 14 is a tested sample and 15 is a motion direction of the sample relative to a probe;

FIG. 9 is a schematic diagram 1 of a measurement method for bending motion and twisting motion of independent operating probes;

FIG. 10 is a schematic diagram 2 of a measurement method for bending motion and twisting motion of independent operating probes;

wherein 16 is a spot formed by irradiating laser on a cantilever beam 2; 17 is a spot formed by irradiating the laser on a cantilever beam 3; 18 is a laser spot reflected on or outside a laser position sensitive detector 300 through the cantilever beam 2; 19 is a laser spot reflected on the laser position sensitive detector 300 through the cantilever beam 3; and 20 is a laser path;

FIG. 11a is a schematic diagram of an atomic force microscope system which can realize rapid in-situ switching, imaging and measurement of integrated dual probes under the condition that dual probes can be driven;

FIG. 11b is a schematic diagram of an atomic force microscope system which can realize rapid in-situ switching, imaging and measurement of integrated dual probes under the condition that only a single-sided probe can be driven;

wherein 21 is an AC signal of an operating probe; 22 is a lock-in amplifier; 23 is a subtracter; 24 is a feedback controller; 25 is a three-dimensional motion driver for controlling the scanning imaging of an atomic force microscope; 26 is a displacement driver of the operating probe; 27 is a compound signal of DC shift and an AC vibration signal; and 28 is a DC isolation circuit;

FIG. 12 shows a motion state curve of the operating probe during measurement or imaging;

wherein 29 is high-frequency up and down motion made by the cantilever beams, and 30 is a distance that the operating probe moves towards a sample surface.

DETAILED DESCRIPTION

The present invention will be further described in detail below in combination with the drawings and the embodiments.

Integrated dual probes, and drive, measurement and control devices thereof are provided. More than one probe is arranged. The physical properties of the probes comprise spring constants, needle tip sizes and needle tip material, at least one of which has essential difference.

Interaction points between the probes and the sample can be replaced by translation of a hinge system. the replacement time is less than 10 seconds; the repeated positioning accuracy of the interaction points of the probes is higher than 1 micron; A multi-probe operation and use method based on an atomic force microscope technology has more than one probe.

Interaction points between the probes and the sample can be replaced by translation of a hinge system. The replacement time is less than 10 seconds; the repeated positioning accuracy of the interaction points of the probes is higher than 1 micron.

The distance between two cantilever beams of the integrated dual probes is less than 10 microns.

The integrated dual probes adopt a hinge structure. A probe carrier of the integrated dual probes can move independently. The independent motion of the probe carrier of the integrated dual probes is driven by a piezoelectric ceramic driving mode. Piezoelectric ceramics produce a driving force for the independent probes, and the probe carrier produces the deformation of a lever principle to realize independent motion, with a motion range greater than 1.5 microns.

The independent displacement measurement of the integrated dual probes is realized by a light rod measurement method. Laser spots are simultaneously irradiated on two cantilever beams and reflected onto position sensitive detectors (PSDs). An operating probe for imaging or measurement produces periodical motion, a non-operating probe does not produce periodical motion. The interference of the non-operating probe is removed by a "DC isolation" circuit or background noise removal method with peak force tapping.

The operating probe can realize advanced imaging and measurement modes such as a contact mode and a peak force tapping mode.

Figure 1:
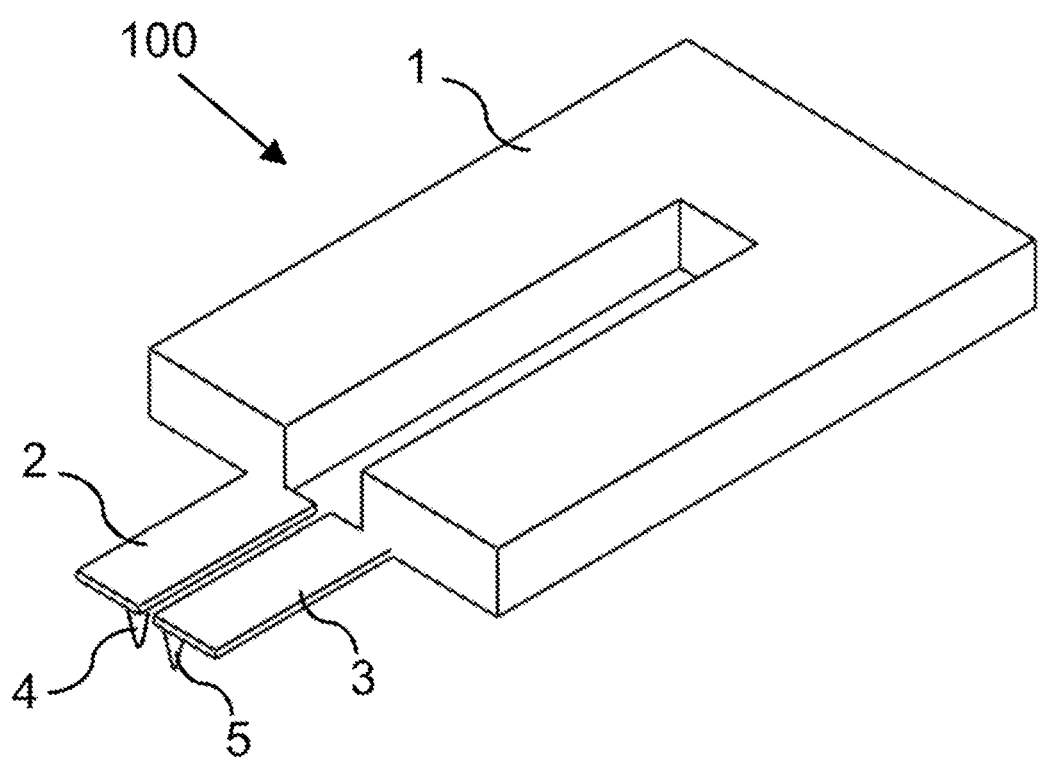
FIG. 1 is a structural schematic diagram of integrated dual probes of the present invention; wherein 1 is a hinge structure, 2 and 3 are probe cantilever beams respectively, and 4 and 5 are probe tips respectively.

As shown in FIG. 1, the integrated dual probes 100 of the present invention are composed of a hinge structure 1, cantilever beams 2 and 3 and needle tips 4 and 5 on free ends of the cantilever beams. The main geometry of the hinge structure is of "U" shape, and two cantilever beams 2 and 3 protrude from "U"-shaped ends respectively. The cantilever beams 2 and 3 and the hinge structure form an asymmetric cantilever beam. Two probe needle tips 4 and 5 protrude from the lower parts of the free ends of the cantilever beams 2 and 3 respectively, and the needle tips 4 and 5 may have different geometric sizes or/and different materials according to application requirements.

Figure 2A:
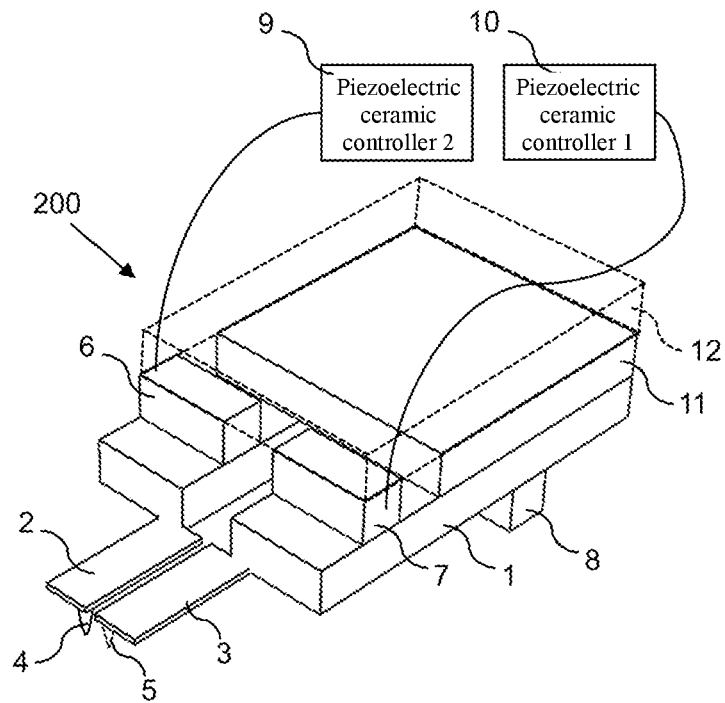
FIG. 2a is a structural schematic diagram 1 of integrated dual probes and two forms of probe champs of the present invention.

As shown in FIG. 2a, an integrated dual-probe champ 200 of the present invention is composed of probe independent driving piezoelectric ceramics 6 and 7, a fixture 8, a probe base 11 and a probe clamp fixing base 12. The probe base 11 is rigidly connected with the probe clamp fixing base 12, and the integrated dual probes 100 are fixed on the probe base 11 through the fixture 8 by a certain force. Piezoelectric ceramic controllers 9 and 10 control the piezoelectric ceramics 6 and 7 respectively to drive the integrated dual probes to realize independent motion.

Figure 2B:
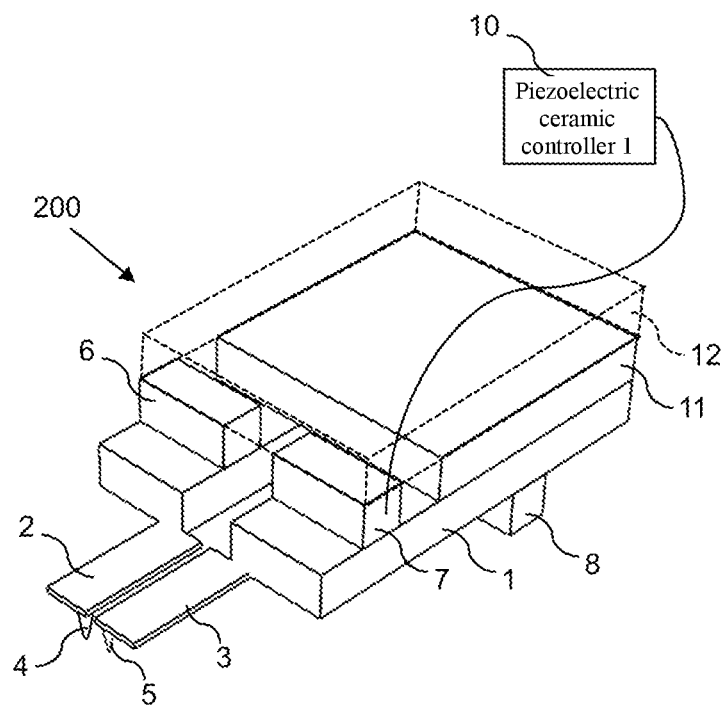
FIG. 2b is a structural schematic diagram 2 of integrated dual probes and two forms of probe champs of the present invention; wherein 6 and 7 are piezoelectric ceramics respectively; 8 is a fixture; 9 and 10 are piezoelectric ceramic controllers respectively; 11 is a probe base; and 12 is a probe champ fixing base.

As shown in FIG. 2b, in another form of the integrated dual-probe champ 200 of the present invention, only one probe is driven to realize the rapid in-situ switching and measurement of the operating probe and the non-operating probe. The integrated dual-probe champ 200 is composed of probe independent driving piezoelectric ceramic 7, a fixture 8, a probe base 11, a probe clamp fixing base 12 and a single-probe fixing base 6. The probe fixing base 6, the probe base 11 and the probe clamp fixing base 12 are rigidly connected, and the integrated dual probes 100 are fixed on the probe base 11 through the fixture 8 by a certain force. A piezoelectric ceramic controller 10 controls the piezoelectric ceramic 7 to drive the single-sided probe of the integrated dual probes to realize independent motion.

Figure 3:
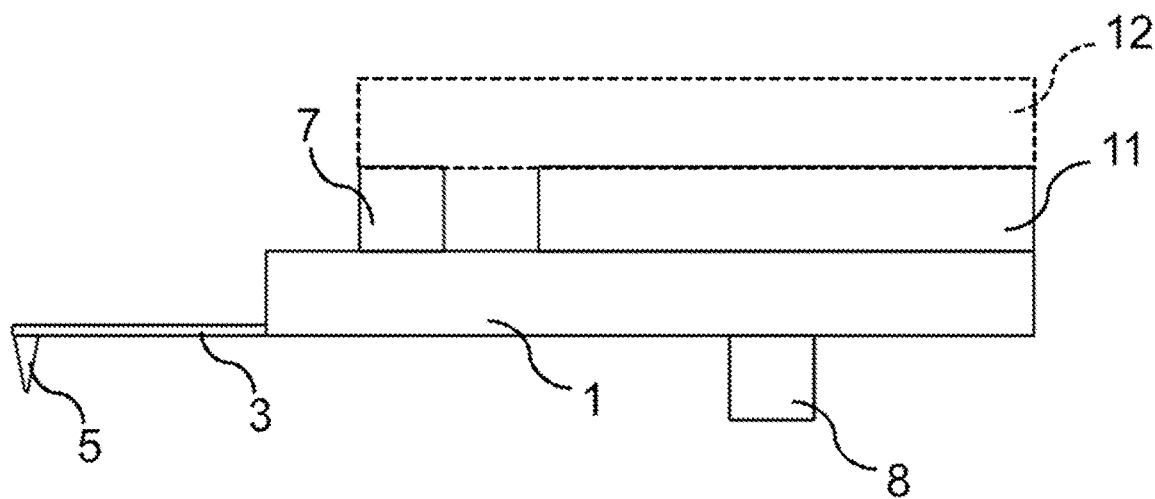
FIG. 3 is a schematic diagram 1 of independent motion of one probe of integrated dual probes driven by a probe champ in the present invention.
Figure 4:
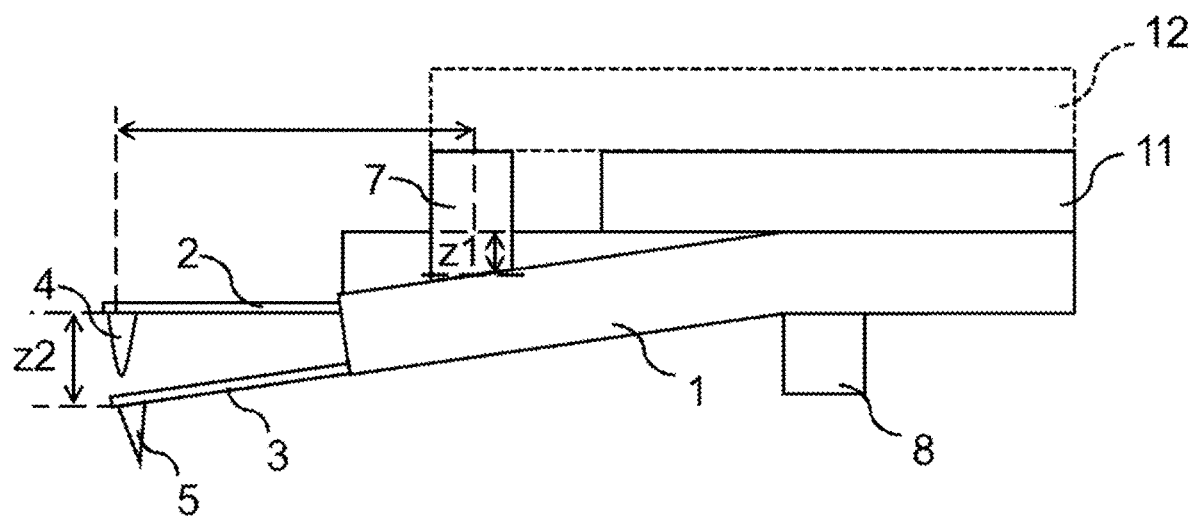
FIG. 4 is a schematic diagram 2 of independent motion of one probe of integrated dual probes driven by a probe champ in the present invention.

As shown in FIG. 3, when the integrated dual probes and the probe champ of the present invention are in a stationary state, the probes do not produce any motion. FIG. 4 shows an embodiment of the present invention. When the piezoelectric ceramic 7, the probe base 11 and fixture 8 form a lever structure and the piezoelectric ceramic 7 extends by z1 distance, bending deformation is produced on one side of the hinge structure 1 corresponding to the cantilever beam 3 using the fixture 8 as a supporting point; and a displacement distance at the needle tip 5 is z2. The extension distance z1 of the piezoelectric ceramic 7 is directly related to the displacement distance z2 of the needle tip 5.

Therefore, the displacement distance z2 of the needle tip 5 can be controlled by the extension distance z1 of the piezoelectric ceramic 7.

Figure 5:
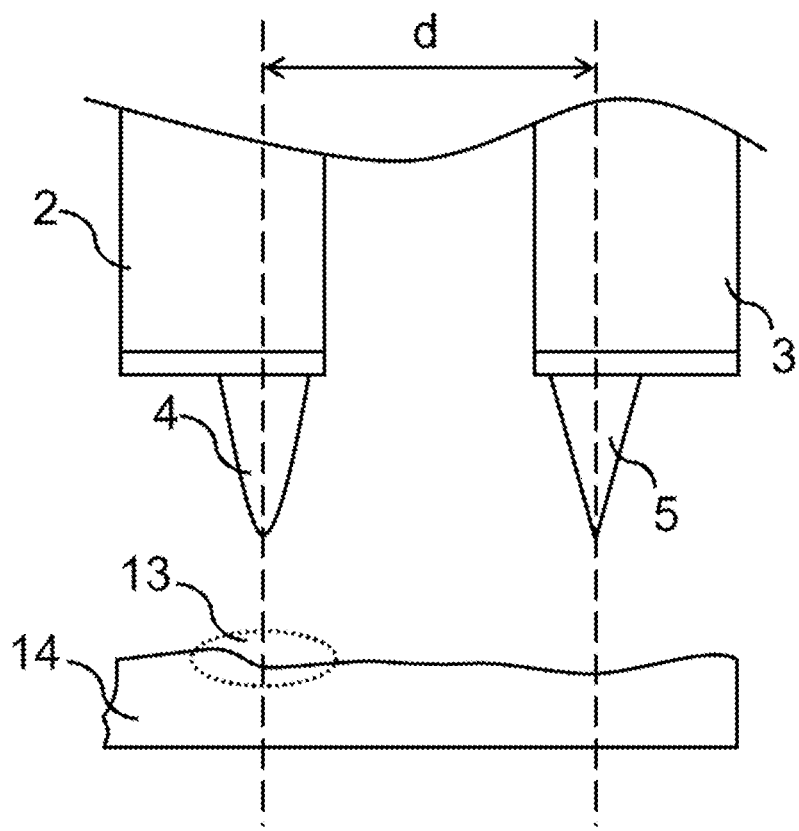
FIG. 5 is a schematic diagram 1 of an independent in-situ switching process of two probes in integrated dual probes in the present invention.
Figure 6:
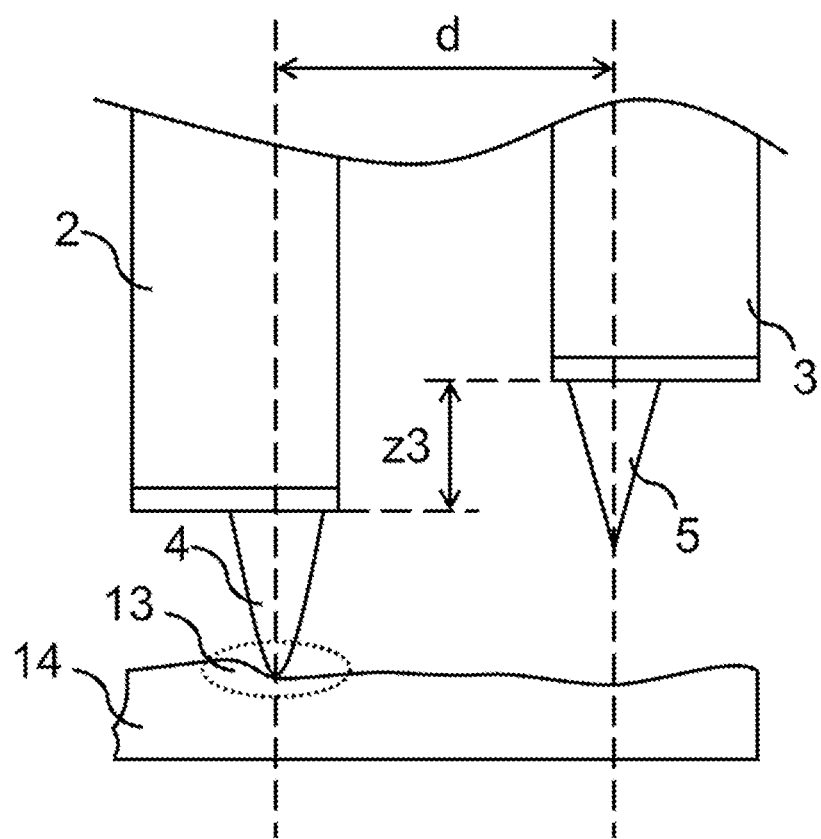
FIG. 6 is a schematic diagram 2 of an independent in-situ switching process of two probes in integrated dual probes in the present invention.
Figure 7:
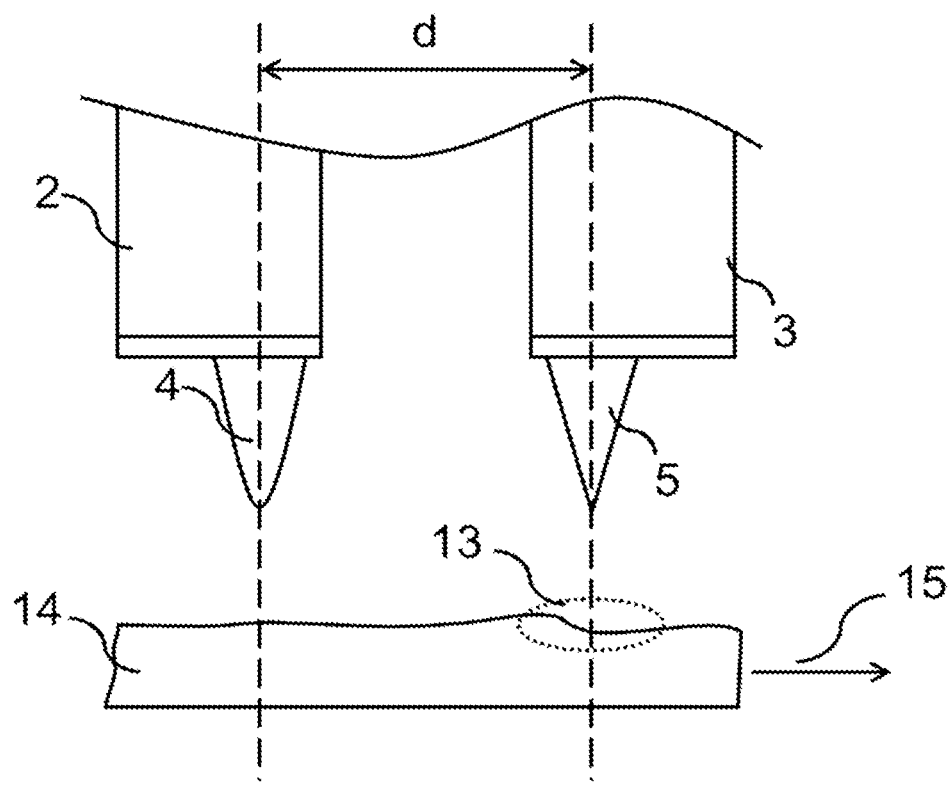
FIG. 7 is a schematic diagram 3 of an independent in-situ switching process of two probes in integrated dual probes in the present invention.
Figure 8:
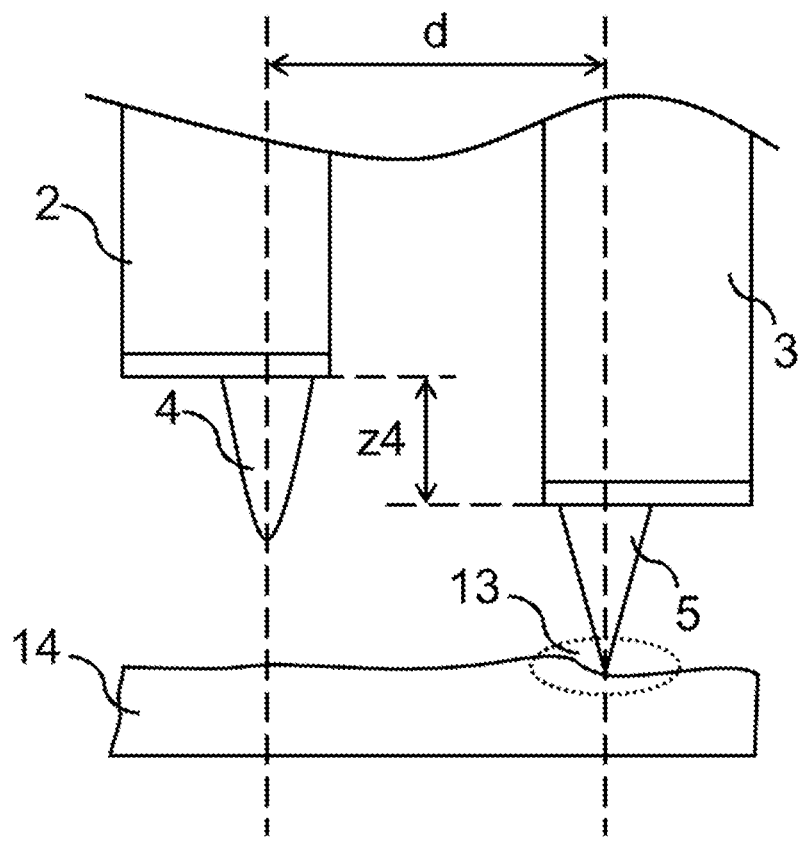
FIG. 8 is a schematic diagram 4 of an independent in-situ switching process of two probes in integrated dual probes in the present invention.

FIG. 5 to FIG. 8 show embodiments of the independent in-situ switching process of two probes in the integrated dual probes of the present invention. As shown in FIG. 5, in a non-operating state, the positions of the cantilever beams 2 and 3 are in a horizontal state, a test point 13 on a sample 14 is located below the needle tip 4, and a distance between the needle tip 4 and the needle tip 5 is d. As shown in FIG. 6, the cantilever beam 2 is controlled to produce relative motion with a distance of z3 from the sample 14. At this moment, the needle tip 4 comes into contact with the test point 13 on the sample 14 for measurement or scanning imaging. As shown in FIG. 7, the cantilever beams 2 and 3 are controlled to produce relative motion and the positions thereof are in a horizontal state. The relative motion between the integrated dual probes 100 and the sample 14 is controlled, and the sample 14 moves along a motion direction 15 by a distance d. At this moment, the measurement point 13 is located below the needle tip 5. As shown in FIG. 8, the cantilever beam 3 is controlled to produce relative motion with a distance of z4 from the sample. The needle tip 5 comes into contact with the measurement point 13 for measurement or scanning imaging. Thus, the present embodiment completes a rapid in-situ switching process of the probe.

FIG. 9 and FIG. 10 show measurement methods for bending motion and twisting motion of independent operating probes. As shown in FIG. 9, the laser is irradiated on the cantilever beams 2 and 3, and laser spots 16 and 17 are formed on the cantilever beams respectively, and reflected onto a position sensitive detector 300 to form laser spots 18 and 19 respectively. The cantilever beam 3 is controlled to move downward, and at this moment, the laser spot 19 reflected by the cantilever beam 3 also moves downward. The cantilever beam 2 does not move, and the laser spot 18 reflected by the cantilever beam 2 does not move. The position of the position sensitive detector 300 is adjusted, so that the position sensitive detector 300 is in the center position and the laser spot 18 is located at the outer side or at the edge of the position sensitive detector 300. As shown in FIG. 10, the position sensitive detector 300 is a four-quadrant detector. When the cantilever beam 3 moves independently, the laser spot 19 reflected to the position sensitive detector 300 by the cantilever beam produces corresponding transverse and longitudinal motion, and the laser spot 18 reflected by the stationary cantilever beam 2 is outside the position sensitive detector 300, so as to analyze the twisting motion and the bending motion of the cantilever beam 3. When the laser spot 18 reflected by the stationary cantilever beam 2 is inside the position sensitive detector 300, because the laser spot 18 is stationary, the twisting motion and the bending motion of the cantilever beam 3 can be analyzed by methods of low pass filtering, DC isolation or background noise removal.

FIG. 11a shows an embodiment of an atomic force microscope system which can realize tapping mode imaging of the integrated dual probes. Single-sided driving is taken as an example in the present embodiment, and the driving of the other side is similar to the present embodiment. The laser is irradiated on the operating cantilever beam 3, and reflected onto the position sensitive detector 300 to form the laser spot 19. A compound signal 27 of a DC shift signal and an AC vibration signal generated by an operating probe displacement driver 26 is sent to the piezoelectric ceramic controller 10, the piezoelectric ceramic 7 is driven to produce compound motion of static shift and high frequency vibration, and the cantilever beam 3 is driven to produce compound motion of the same mode. The piezoelectric ceramic controller 9 does not operate, and does not produce any driving signal. The motion of the cantilever beam 3 is detected by the position sensitive detector 300 after amplified by the laser light path 20, and a generated operating probe AC signal 20 is sent into a lock-in amplifier 22 as an input signal. A compound signal 27 of the DC shift signal and the AC vibration signal passes through a DC isolation circuit 28, and the AC vibration signal is sent into the lock-in amplifier 22 as a reference signal. The lock-in amplifier 22 outputs the amplitude of a signal component of the operating probe AC signal 21 in the same frequency as the reference signal, sends the amplitude into a subtracter 23 to make a difference with a set value of the amplitude, and sends the difference value to a feedback controller 24. The feedback controller 24 outputs a control signal and sends to a three-dimensional motion driver 25 to control the three-dimensional motion of a scanning head or sample to realize scanning imaging.

FIG. 11b shows an embodiment of an atomic force microscope system which can realize tapping mode imaging of the integrated dual probes. A single-sided probe is driven only in the present embodiment, and the probe on the other side is a stationary probe. The laser is irradiated on the operating cantilever beam 3, and reflected onto the position sensitive detector 300 to form the laser spot 19. A compound signal 27 of a DC shift signal and an AC vibration signal generated by an operating probe displacement driver 26 is sent to the piezoelectric ceramic controller 10, the piezoelectric ceramic 7 is driven to produce compound motion of static shift and high frequency vibration, and the cantilever beam 3 is driven to produce compound motion of the same mode. The motion of the cantilever beam 3 is detected by the position sensitive detector 300 after amplified by the laser light path 20, and a generated operating probe AC signal 20 is sent into a lock-in amplifier 22 as an input signal. A compound signal 27 of the DC shift signal and the AC vibration signal passes through a DC isolation circuit 28, and the AC vibration signal is sent into the lock-in amplifier 22 as a reference signal. The lock-in amplifier 22 outputs the amplitude of a signal component of the operating probe AC signal 21 in the same frequency as the reference signal, sends the amplitude into a subtracter 23 to make a difference with a set value of the amplitude, and sends the difference value to a feedback controller 24. The feedback controller 24 outputs a control signal and sends the signal to a three-dimensional motion driver 25 to control the three-dimensional motion of a scanning head or sample to realize scanning imaging.

As shown in FIG. 12, an operating probe shift position 30 represents the distance that the operating probe moves towards the surface of the sample and the need tip comes into contact with the sample. The high frequency vibration motion 29 of the operating probe represents that the cantilever beam makes high-frequency up and down motion, to drive a tapping mode or a compound peak force tapping mode.

The invention claimed is:

1. An integrated dual-probe for atomic force microscope, comprising a hinge structure a first cantilever beam and the second cantilever beam extending from the hinge structure,
wherein each of the first and the second cantilever beams has one end affixed to the hinge structure, a first needle tip affixed to the free end of the first cantilever beam and the second needle tip affixed to the free end of the second cantilever beam, and
a dual-probe clamp,
wherein the duel-probe clamp comprises a fixture, a probe base, a probe clamp fixing base, a first piezoelectric ceramics and a first controller, and a second piezoelectric ceramic and a second controller, the probe base being connected with the probe clamp fixing base, and the hinge structure being affixed to the probe base through the fixture, and,
during operation, the first controller controls the first piezoelectric ceramics to cause movement of the first cantilever arm, and the second controller controls the second piezoelectric ceramics to cause movement of the second cantilever arm.

2. The integrated dual-probe according to claim 1, the first cantilever beam and the second cantilever beam are of different spring constants, the first needle tip and the second needle tip are of different sizes, and/or the first needle tip and the second needle tip are of different materials.

3. The integrated dual-probe according to claim 1, wherein the first cantilever beam and the second cantilever beam are located in a same plane, and have a distance therebetween of less than 10 microns.

4. The integrated dual-probe according to claim 1, further comprising a light detector configured to receive laser beams reflected by the first and the second cantilever beams.

5. The integrated dual-probe according to claim 1, configured to operation in a contact mode, a tapping mode, or a peak force tapping mode through the dual probes.

6. A method for operating the integrated dual-probe according to claim 1, comprising: placing a sample below the first needle tip of the first cantilever beam; lowering the first needle tip from an initial position thereof by activating the first piezoelectric ceramics using the first controller so that the first needle tip contacts a measurement point on the sample for measurement or scanning imaging;
returning the first needle tip to the initial position;
moving the sample move by a distance that equals a distance between two needle tips to place the test point the second needle tip;
lower the second cantilever beam from an initial position thereof by activating the second piezoelectric ceramics using the second controllers so that the second needle tip contacts the measurement point for measurement or scanning imaging.

7. The method according to claim 6, further comprising:
irradiating a laser beam on the first and the second cantilever beams;
receiving a first reflected laser beam from the first cantilever beam by a light detector to form a first laser spot in the light detector;

receiving a second reflected laser beam from the second cantilever beam by the light detector to form a second laser spot in the light detector;

adjusting a position of the light detector so that a center of the second laser spot is in a center of a detection area of the light detector the first laser spot is at a periphery or outside of the detection area of the light detector;

moving the second cantilever beam to cause movements of the second laser spot, and keeping the first cantilever unmoved so that the first laser spot is unmoved, wherein a transverse movement of the second laser spot represents a twisting motion of the second cantilever beam and a longitudinal movement of the second laser spot represents a bending motion of the second cantilever beam.

8. The method according to claim 7, further comprising sending a compound signal to the second controller, wherein the compound signal comprises a direct current component and an alternate current component; and causing the second cantilever beam to shift and vibrate.

* * * * *